Figure 1:
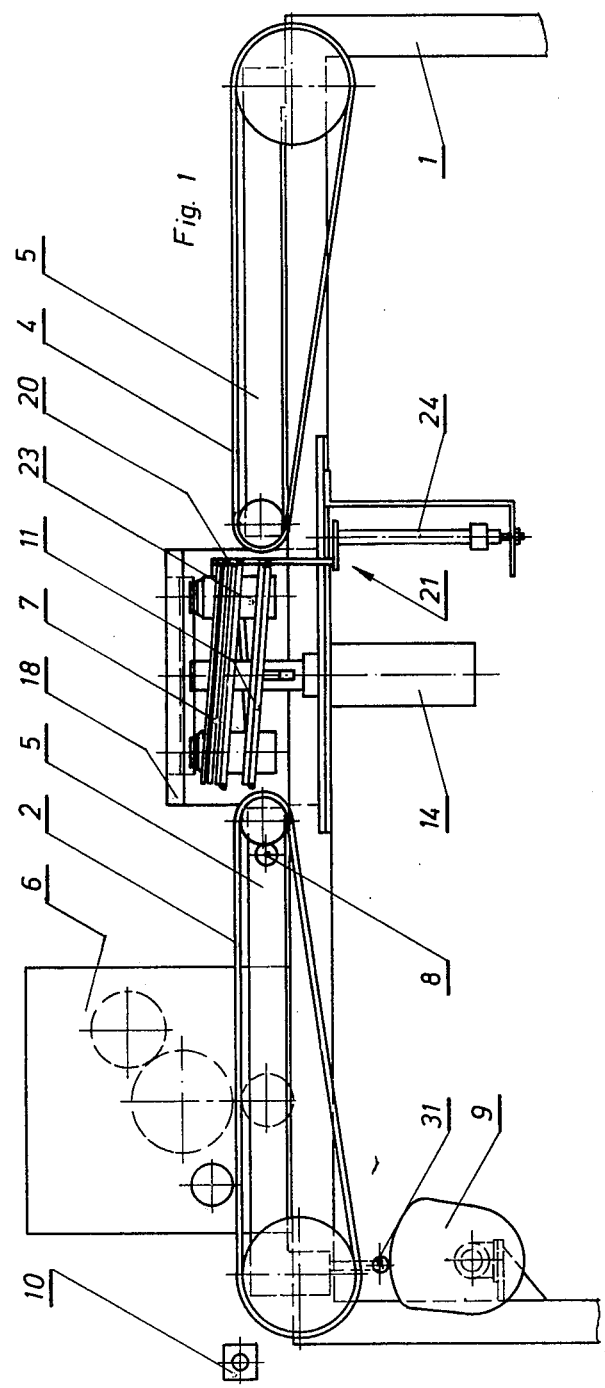

United States Patent [19]

Haas, Sr. et al.

[11] 4,246,290
[45] Jan. 20, 1981

[54] PROCESS FOR MANUFACTURING WAFFLE BLOCKS

[76] Inventors: Franz Haas, Sr., Gerstlgasse 25, Wien, Austria, 1210; Franz Haas, Jr., Castellezgasse 32, Wien, Austria, 1020; Johann Haas, Wienerstrasse 209-215, Spillern (Nö), Austria, 2104

[21] Appl. No.: 886,402

[22] Filed: Mar. 14, 1978

[30] Foreign Application Priority Data

Mar. 25, 1977 [AT] Austria .................................. 2098/77

[51] Int. Cl.³ ........................ A21D 13/00; A23G 3/00
[52] U.S. Cl. .................................. 426/275; 99/450.4; 426/274; 426/94; 426/103
[58] Field of Search ................. 99/450.4, 450.5, 450.7, 99/450.1, 450.2, 443 C, 644; 426/94, 502, 103, 572, 391, 302, 808, 275, 274, 281, 283, 297, 138, 282; 198/625

[56] References Cited

U.S. PATENT DOCUMENTS

| 2,838,010 | 6/1958 | Farrer | 99/450.4 |
| 2,853,961 | 9/1958 | Oakes | 99/450.4 |
| 3,348,503 | 10/1967 | Beik et al. | 99/450.4 |
| 3,680,679 | 8/1972 | Lehmann et al. | 198/625 X |
| 3,867,559 | 2/1975 | Haas | 426/283 |
| 3,983,798 | 10/1976 | Crispe | 99/450.4 |
| 4,098,909 | 7/1978 | Mims | 426/274 |
| 4,108,319 | 8/1978 | Kacirek et al. | 198/625 X |

*Primary Examiner*—Kenneth M. Schor
*Attorney, Agent, or Firm*—John J. Dennemeyer

[57] ABSTRACT

A process and apparatus for manufacturing waffle blocks filled with cream are disclosed. Individual waffle sheets are moved on a feeder belt into contact with a coating device for coating on one side and are introduced subsequently into a stacking device where they are individually lifted by at least two oppositely mounted upright spiral feeders that grip the waffle sheets and guide them upwardly in succession against each other until a waffle block composed of a predetermined number of waffle sheets is completed. The completed waffle blocks are pushed by the spiral tracks on a run-off belt and discharged.

2 Claims, 4 Drawing Figures

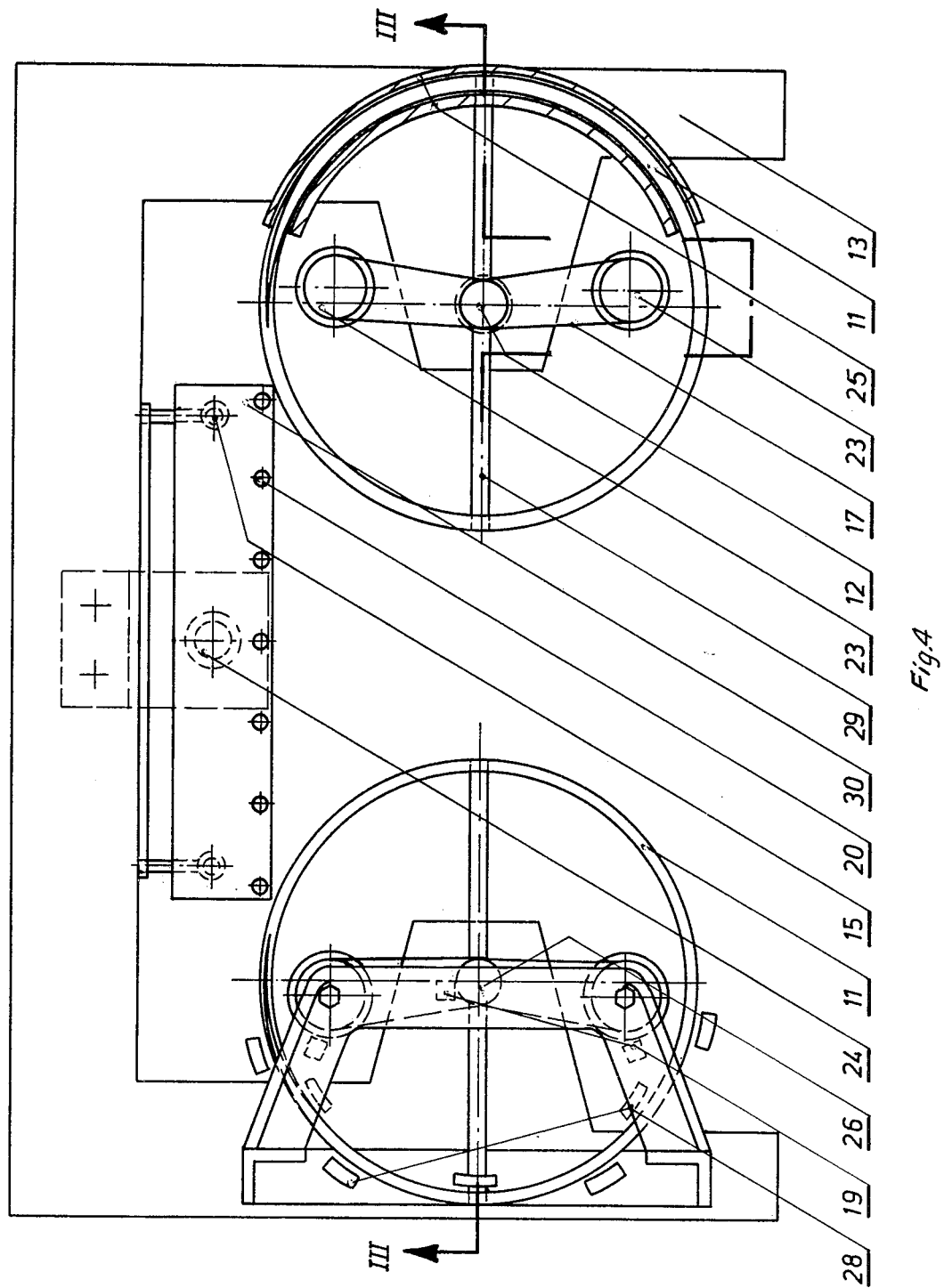

PROCESS FOR MANUFACTURING WAFFLE BLOCKS

The invention relates to a process for manufacturing waffle blocks and to an apparatus for carrying out this process.

The known apparatus for manufacturing waffle blocks filled with cream is by means of a single cream device which is shaped as a drop shaft. The waffle block is formed on a waffle block run-off belt disposed below the drop shaft. In order to avoid that the waffle sheets tip over immediately upon entering the drop shaft and thus strike the coated waffle sheet already in place in the shaft with their edge, each waffle sheet is first deposited on several slidably mounted support elements arranged above the run-off belt in the drop shaft. These support elements must release the waffle sheet forming the waffle block before the next waffle sheet arrives. The waffle sheet must be positioned so as to be outside the path of the support elements and the latter must thereafter return into their starting position in order to receive the following waffle sheet. The released waffle sheet floats down in the drop shaft and positions itself on the run-off belt, or on the coated waffle sheets already positioned on this belt. The waffle cover sheet is brought in also in the same manner but the table of the coating device is lowered, for example, so that this waffle sheet is not coated with cream. When the waffle block is complete the run-off belt is actuated and the waffle block removed from the drop shaft. In this respect see the disclosure of Austrian Pat. No. 245 514.

An apparatus of this type handles, depending on the size, between 1500 and 2400 waffle sheets per hour. With this type of output the period available for the removal of the waffle block from the stacking device ranges between only 2.4 and 1.5 seconds. During this short period the run-off belt must start up, guide the waffle block from the drop shaft and finally be stopped again so that it is stationary when the first waffle sheet of the following waffle block floats down. If the run-off belt is not stationary this first waffle sheet will be moved along and offset relative to the following waffle sheets of the waffle block.

The working speed of this known device is limited due to the fact that this run-off operation cannot be accelerated. In recent times automatic baking ovens have been developed whose performance is substantially greater than that of the known apparatus for manufacturing waffle blocks. In this respect there exists the problem that either the maximum output of the automatic baking oven cannot be utilized or that in order to do so it is necessary to use two known devices in parallel operation. This again requires an additional auxiliary device. It is the purpose of this invention to provide a process and apparatus for manufacturing waffle blocks in which the assembly of the waffle sheets and also the removal of the waffle block is carried out in such a way that even at the highest operating speed the block formation is not impeded by the removal of the completed waffle block.

According to the process of the invention this is obtained in that first an uncoated waffle sheet is lifted and thereafter cream coated waffle sheets are successively pushed under this lifted waffle sheet and also lifted and thus positioned against the one or more prior waffle sheets already in position. The first uncoated waffle sheet as well as the already assembled additional waffle sheets are preferably maintained in the lifted position. The device for carrying out the process of the invention consisting of a feeder belt with a cream coating device, a waffle block run-off belt provided, if appropriate, with a calibrating roll, and a stacking device disposed between these belts, is characterized in that the stacking device consists of two oppositely disposed vertical feeders which take hold of the waffle sheets and are disposed adjacent the feeder belt or in its extension. It is preferable to have two oppositely mounted vertical feeders formed of counter rotating spiral tracks formed preferably from round spring steel, wherein their average diameter corresponds approximately to the length of the waffle sheets in the feeding direction of the feeder belt. In this regard it will be apparent from what follows and from the drawing, particularly FIG. 2, that the reason for two spiral tracks is that the waffle sheet generally will need support from at least two spaced apart locations.

The process of the invention or the apparatus for carrying it out make possible a very gentle handling of the individual waffle sheets and a very exact and rapid formation of the waffle blocks. This is due primarily to the fact that the actual stacking device does not have any support elements which extend into the path of the waffle sheets and have to be retracted to release the waffle sheets and be returned into their starting position. According to the present invention the distance between the individual waffle sheets is maintained by the vertical feeder itself. Furthermore the waffle block is not formed by a free fall of the waffle sheets on the run-off belt but by the positive transportation by means of the vertical feeders. Accordingly the time period required therefore can be influenced also by the speed of the vertical feeders.

In the preferred device for carrying out the process according to the invention by means of spiral tracks as vertical feeders the coils of the spiral tracks take over the task of the support elements. The spiral tracks as vertical feeders present also the advantage that through their rotary movement the waffle sheets are transported not only in a vertical but also in a horizontal direction. It requires merely an abutment which prevents the horizontal transporting of the waffle sheets at which the waffle sheets may slide upwards to be assembled into a waffle block.

As soon as the abutment is removed the wafffle sheet or waffle block is lifted automatically from the stacking device. This push-out movement of the spiral tracks can be improved by means of auxiliary devices in the form of guide rolls or an endless feeder belt that can be driven and which are arranged within the spiral tracks to grip the waffle sheets at the side edges. As the friction between waffle blocks and spiral tracks is small due to the narrow contact surface relative to the friction between the waffle block and run-off belt the latter pulls the waffle block from the stacking device as soon as it is positioned even with only a small strip on the run-off belt.

In summary, the process of the present invention is a process for making a waffle block having a plurality of waffle sheets. A filling, i.e. a cream filling, is disposed between the waffle sheets. The process includes the steps of conveying with a conveying device a first uncoated covering waffle sheet to a lifting device, the uncoated sheet having an upper side and a lower side, coating an upper side of another waffle sheet with a filling to form a coated sheet; lifting the uncoated sheet above the conveying device, this step of lifting the uncoated sheet being carried out with the lifting device; conveying the coated sheet to the lifting device; lifting the coated sheet above the conveying device, this step of lifting the coated sheet being carried out with the lifting device, the step of lifting the uncoated sheet being performed in the same manner as the step of lifting the coated sheet, the steps of lifting the coated and uncoated sheets being performed by engaging each sheet both with a rotating helical member and also with an abutment, the rotating helical member providing an upward spiral motion, the abutment providing a stop for each sheet to prevent discharge of each sheet from the rotating helical member during lifting, whereby the upward spiral movement lifts the sheets; joining, with the lifting device, the coated sheet to the uncoated sheet solely by the raising of the coated sheet with the lifting device to meet the lower side of the uncoated sheet and without lowering of the lifted, uncoated sheet, the joining being effected by contact of the filling of the coated sheet with the uncoated sheet, the joining step providing a stack having layers of sheets with filling therebetween. If additional layers are desired the foregoing steps of coating a sheet, conveying the coated sheet, lifting the coated sheet and joining the coated sheet are repeated n minus 2 times where n is the number of sheets in the final stack. It is readily apparent that this will be the case, since the joining together of two sheets has already been described, and thus the number of repetitions will be the total number of sheets in the completed stack less 2. It will also be apparent that the joining step, if repeated, includes joining a coated sheet to another coated sheet disposed thereabove solely by the raising of the lower of such sheets; the completed stack being in an elevated position above the conveying device. Thereafter, there is a step of removing the stack from the lifting device in the elevated position of the stack without previously lowering the stack.

The lifting device includes the foregoing helical screw, the lifting device effecting disposition of the sheets one above the other by the helical screw and abutment to thereby provide upper and lower sheets. The lifting device includes a flattened portion at the upper end of the helical screw and continuous therewith, the joining step including moving an upper sheet into engagement with the flattened portion by the action of the helical screw to thereby terminate lifting and also bringing a lower sheet into engagement with the upper sheet by the action of the helical screw member to accomplish the joining step.

Accordingly the process of the invention or the apparatus for carrying it out make it possible to increase the number of waffle sheets to be treated per minute to a considerable degree relative to the known devices and to operate the production of waffle sheets of a large automatic waffle oven in a single apparatus. The process of the invention and the apparatus for carrying it out have furthermore the advantage that broken-away pieces of waffle sheets do not drop, as in the known apparatus, on top of the already assembled waffle sheets from which they can no longer be removed due to the cream and thus can make the entire waffle block unsuitable, while in this invention they drop between the spiral tracks from the apparatus.

Figure 2:
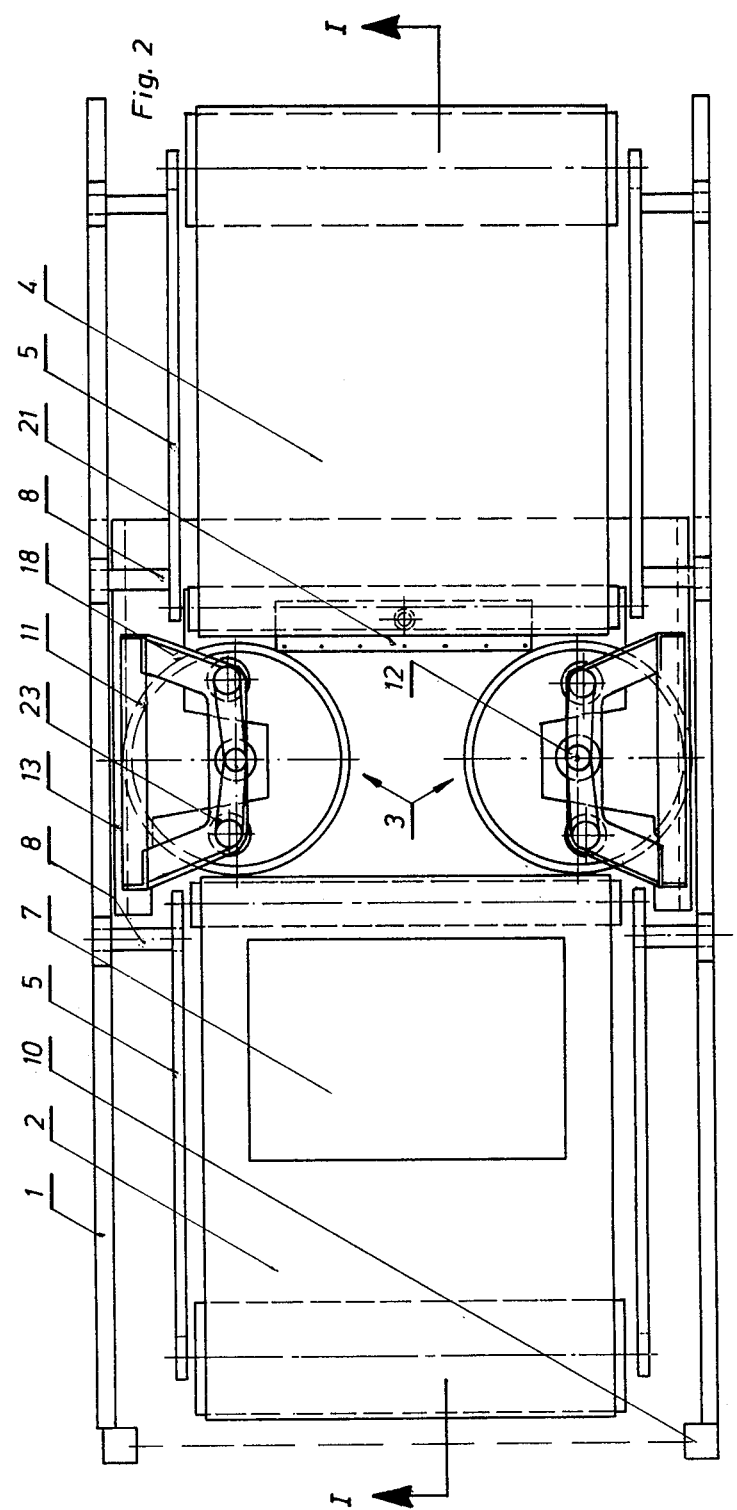
Figure 3:
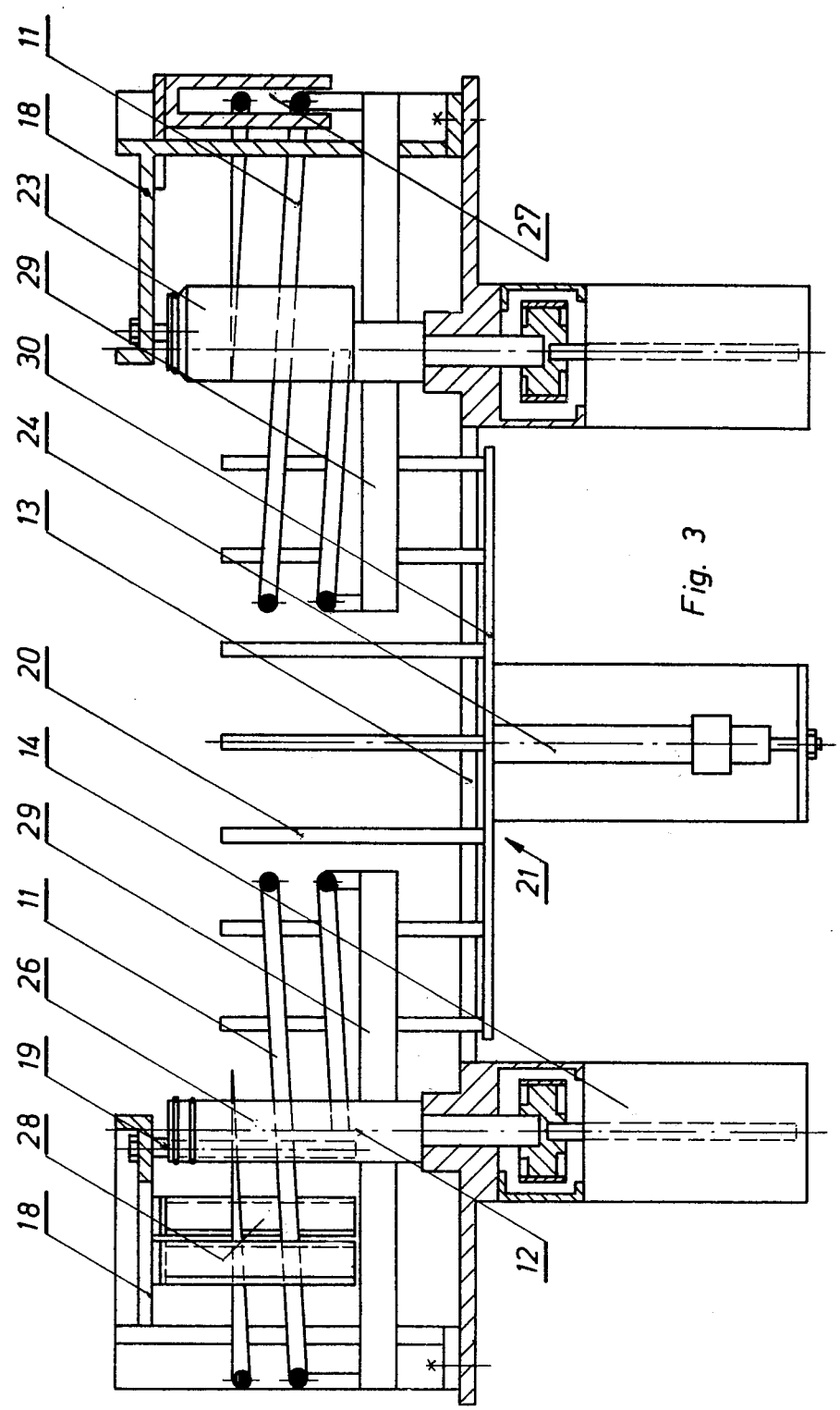

The apparatus according to the invention presents additionally the advantage that it requires very little space so that the length of an installation for manufacturing waffle blocks can be considerably reduced. The invention will be explained in greater detail hereafter by describing an embodiment for carrying out the process of the invention illustrated in the accompanying drawings, in which:

FIG. 1 shows a section through the apparatus of the invention along line I—I of FIG. 2, FIG. 2 is a plan view of the apparatus according to FIG. 1, FIG. 3 shows a section of the stacking device along line III—III of FIG. 4, and, FIG. 4 is a plan view of the stacking device according to FIG. 3.

The apparatus of the invention consists of a frame 1 in which conveying device in the form of a feeder belt 2, a stacking device 3 and a run-off belt 4 are mounted. It will be apparent from the foregoing, from the drawing, and from what follows that the feeder belt 2 feeds unfinished waffle sheets into a stacking device, that run-off belt 4 removes the finished product from the stacking device, and that therefore there are two belts 2, 4. The two belts 2, 4 have each a frame 5 by which they are mounted on frame 1. Above the feeder belt 2 a conventional cream coating device 6 is secured and above the run-off belt 4, if appropriate, a calibrating roll (not shown) for the waffle block. The frame of the feeder belt 2 is pivotably mounted on a horizontal shaft 8 disposed directly in front of a stacking device 3. Accordingly it is possible to lower the feeder belt 2 in the range of the cream coating device 6 relative thereto. This is necessary in order to cover a waffle block assembled from coated waffle sheets 7 with an uncoated waffle sheet. The lowering of the frame 5 of the feeder belt 2 is obtained by a control cam 9 which is intermittently driven by a motor and which cooperates with a roll 31 extending downwardly from frame 5. In the rest position of cam 9 the feeder belt 2 is in a position necessary for the coating of the waffle sheets with cream by the cream coating device 6 as it is illustrated in FIG. 1. The lowering of the feeder belt 2 is controlled over a light gate 10 arranged in front of it and by an adjustable counting mechanism. The number of waffle sheets of a waffle block can be set at the counter mechanism. According to the process of the invention it is necessary that the first waffle sheet of each waffle block is not coated.

An essential feature of the invention resides in the stacking device 3 necessary for carrying out the process of the invention. In the embodiment illustrated in the drawings the stacking device 3 consists of two spiral feeders 11. However, this is only one of several possible solutions for carrying out the process of the invention. In place of spiral feeders 11 one could use with the same result for example also vertically arranged feeder belts which are provided with horizontally arranged catch elements which would be designed in that case also so that they could be extended or retracted relative to the feeder belts.

It would also be possible to obtain the lifting of the waffle sheets by means of compressed air and to maintain the waffle sheets in the lifted position by creating a low pressure above the waffle sheets. In that arrangement the stacking device would consist of a shaft in whose bottom one or several outlet openings for compressed air would be provided and which would present at its front wall facing the feeder belt an entrance slot for the waffle sheets, and at the front wall facing the waffle block run-off belt a closable exit slot for the waffle block.

The stacking device 3 for carrying out the process of the invention is formed of spiral feeders 11 and consists, as shown in FIGS. 3 and 4, of two spirals formed of spring steel which rotate in opposite direction and are wound contrary to the direction of rotation. The right spiral track 11 as seen in the transporting direction of the feeder belt 2 ascends in the counter clock-wise direction and rotates in the clock-wise direction. In the case of the opposite spiral track 11 it is just the reverse. The diameter of the spiral tracks 11 corresponds approximately to the length of a waffle sheet 7 in the transporting direction of the belts 2 and 4. Each of the spiral tracks 11 having only two windings is secured by means of a diametrical arm 29 on a shaft 26 which constitutes the rotary axis 12. The arm 29 as well as a half to a full winding of the spiral track 11 is disposed below the transporting plane of the feeder belt 2. When the spiral track 11 is standing still the penetration points between the transporting plane of the feeder belt 2 and the two spiral tracks 11 are disposed outside the actual stacking range and essentially in the plane determined by the rotary axes 12 of the spiral tracks 11. The distance between the rotary axes 12 of the two spiral tracks 11 corresponds to the width of a waffle sheet 7 increased by the diameter of a shaft 26. Under these conditions an optimum support of the brittle and easily breakable waffle sheet 7 is obtained.

The shafts 26 of the spiral tracks 11 are journalled at their lower end in a plate 13 secured to the frame 1 of the apparatus. Each shaft 26 is driven by a motor 14 in such an intermittent manner that the spiral tracks 11 carry out in each instance only one rotation. The regulation of the motors 14 as well as the setting of the control are such that each of the spiral tracks 11 stops always in one and the same position after a rotation. In this manner it is assured that the waffle sheets 7 entering the stacking device do not strike against the coil of the spiral tracks 11 but enter between them. As the spiral tracks 11 are driven by their own motor 14 the space below and above the stacking device is free so that waffle blocks in which faulty waffle sheets were assembled can be removed in a simple manner from the apparatus in that one strikes with the edge of the hand between the spiral tracks 11 on the waffle block, whereby it breaks apart and drops downwardly from the stacking device. For this purpose it is necessary that the gradient of the spiral tracks 11 corresponds to 2.5–4 times their thickness, so that the breakage pieces of the waffle block do not jam between the coils of the spiral tracks. For the same reasons the width of the spiral tracks 11 should also be between one hundredth and one twentieth of the average diameter of the spiral track, and the effective part of the spiral tracks 11, i.e. the part thereof which projects over the transport plane of the feeder belt consists of only one to one and a half windings, wherein the upper end of the spiral track 11 is flattened out.

In order to give more support to the spiral tracks 11, they are provided at the portion located outside the actual stacking area with one or more guides. These guides can be formed either of a slit 27 which is semicircular in cross section, or from several rails 28 arranged in the circumferential direction of the spiral track 11 alternately inside or outside thereof, or from rotably mounted rolls. The wall portions defining the slot 27, and the rails or rolls 28 can be appropriately adjustable separately from each other relative to to the spiral tracks 11. The starting of the motors 14 of the spiral tracks 11 is obtained by the same light gate 10 which controls also the lowering of the feeder belt 2.

An abutment 21 consisting of one or more fingers 20 secured to a plate 30 is arranged directly behind the spiral tracks 11. The waffle sheets 7 slide along this abutment 21 during their upward movement through the spiral tracks 11. As soon as the desired number of waffle sheets 7 set on the counting mechanism has been assembled in the stacking device 3 the abutment 21 slidably mounted on vertical guide rods 15 is lowered. When the second waffle sheet 7 of the following waffle block passes the light gate 10 the spiral feeders 11 are started again and a delay member is activated which after run-off lifts the abutment 21 by one step. In this manner the spiral tracks push, simultaneously with the lifting of the first waffle sheet 7 of the following waffle block, the finished waffle block to the run-off belt 7 which reaches directly to the abutment 21. After the spiral feeders 11 have completed their revolution the abutment returns to its upper end position. In this manner it is avoided that the waffle sheets to be assembled for the new waffle block leaves the stacking device prematurely.

The two-stage return of the abutment 21 into its starting position is required because simultaneously with the removal of the finished waffle block from the stacking device 3 the cover sheet of the following stacking block is moved upwardly therein, and if the abutment 21 were not present at the rear side of the stacking device 3 it would be transfered to the run-off belt. If the abutment returned immediately to its starting position it would follow that the points of fingers 20 of the abutment 21 would slide along the lowermost waffle sheet of the waffle block being removed and would damage it.

The pushing out of the waffle block is carried out by the spiral tracks 11 themselves as well as by the auxiliary devices disposed on the inside of the spiral tracks 11, as well as the run-off belt 14. These auxiliary devices consist of guide rolls 23 which grip the waffle sheets or waffle block at the edges which are parallel to the feeder direction of the belts 2 and 4. The shafts 26 supporting the spiral tracks 11 are also formed as guide rolls. In this way it is assured that the finished waffle block has already left the stacking device 3 before the first waffle sheet and the following waffle block reaches the uppermost position in the stacking device.

The actuation of the abutment 21 is obtained by means of a compressed air cylinder 24 which engages at the plate 30, and which is also regulated by the light gate 10 and the counting mechanism.

The drive of the guide rolls 23 is obtained from shaft 26 of the spiral track 11 over V-belts or round belts 17. The guide rolls 23 of the auxiliary device, which stand still when the waffle sheets are fed in, have also the task of assuring the exact proper positioning of the individual waffle sheets relative to each other, as well as assisting the stacking device 3 during the removal of the waffle block therefrom. However, it is possible to provide a drive of the guide rolls 23 which is independent of the drive for the spiral tracks 11, whereby they are able to assist the feeder belt 2 when bringing in the waffle sheet 7 into the stacking device 3.

The shafts of the guide rolls 23 are mounted at their upper end in a gallows-type console 18. Each of the guide rolls 23, as well as the shaft 26 supporting the spiral track 11, has associated therewith a scraper 19 in order to prevent the accumulation of cream escaping sideways from the waffle block on the guide roll 23 or shaft 26. The spiral tracks 11 do not require any scrapers as the spirals clean themselves automatically due to the relative movement with respect to the waffle sheets. The two guide rolls 23 can also constitute deflecting rolls for a feeder belt which could fulfill the same functions.

The operation of the apparatus according to the invention will be described now with reference to the manufacture of a five layer waffle block. As soon as the first waffle sheet passes the light gate 10 the control will switch on the motor of cam 9 and the frame with the feeder belt 2 is lowered, so that the waffle sheet passes uncoated below the cream coating device. The light gate 10 actuates simultaneously the drive for the spiral tracks 11. Thereby the last waffle sheet of the waffle block is lifted up and placed from below against the already assembled waffle sheets so that the waffle block is now complete. In this regard, it will be apparent that each waffle sheet after the uncoated sheet (including the last) has been lifted up from below to join the waffle sheet or sheets above it. Obviously, when a waffle sheet reaches the aforementioned upper flattened out portion of the spiral track it will go no higher. In the meantime, however, another sheet will enter the spiral track and rise. It will be readily apparent that when this latter sheet reaches the upper part of the spiral track it will meet and join the aforementioned other sheet at the upper flattened part. After the spiral tracks 11 have gone through a complete revolution, the control switches off the drive 14 of the spiral tracks 11. The uncoated waffle cover sheet of the following waffle block is inserted into the thus free lower coil of the spiral tracks 11. Simultaneously the abutment 21 is lowered by two steps in such a way that the fully assembled waffle block is released but that the subjacent first waffle sheet of the following waffle block strikes against the abutment 21. When the second waffle sheet passes the light gate 10 the feeder belt 2 is not lowered and so this waffle sheet is coated at its upper side with cream in the cream coating device 6.

As soon as the spiral tracks 11 commence to rotate they slide the finished waffle block by means of the guide rolls 23 on the run-off belt 4 and feed the subjacent uncoated waffle sheet 7 of the following waffle block upwardly. In other words, the same spiral action effects both raising of first waffle sheet of the new block and discharge of the finished block from the stacking device without a separate lowering action. In the meantime the abutment 21 goes up by one step. The second waffle sheet coated during this time is inserted into the thus free lower coil of spiral tracks 11. Furthermore the abutment is lifted to the second step.

When the third waffle sheet passes the light gate 10 the drive of the spiral tracks 11 is switched on again and the second waffle sheet is lifted and placed from below against the waffle cover sheet. During this time the third waffle sheet is coated and is inserted into the again free lower coil of the spiral tracks 11. This procedure is repeated corresponding to the desired number of sheets of the waffle block so many times until the last coated waffle sheet of the waffle block is located on the lower coil of the spiral tracks 11. In the case of a five-layer waffle block thus two more times. Thereafter the entire process starts over again.

What is claimed is:

1. A process for making a waffle block having plural waffle sheets with a cream filling therebetween, the process comprising the steps of:
   (a) conveying with a conveying device a first, uncoated covering waffle sheet to a lifting device, the uncoated sheet having an upper side and a lower side;
   (b) coating an upper side of another waffle sheet with a filling to form a coated sheet;
   (c) lifting the uncoated sheet above the conveying device, said step of lifting the uncoated sheet being carried out with the lifting device;
   (d) conveying the coated sheet to the lifting device;
   (e) lifting the coated sheet above the conveying device, said step of lifting the coated sheet being carried out with the lifting device, said step of lifting the uncoated sheet being performed in the same manner as said step of lifting the coated sheet, said steps of lifting said coated and uncoated sheets being performed by engaging each sheet both with a rotating helical member and also with an abutment, the rotating helical member providing an upward spiral motion, the abutment providing a stop for each sheet to prevent discharge of each sheet from the rotating helical member during lifting, whereby the upward spiral movement lifts said sheets;
   (f) joining, by means of the lifting device, the coated sheet to the uncoated sheet solely by the raising of the coated sheet with the lifting device to meet the lower side of the uncoated sheet and without lowering of the lifted uncoated sheet, said joining being effected by contact of the filling of the coated sheet with the uncoated sheet, said joining step providing a stack having layers of sheets with filling therebetween;
   (g) forming a completed stack of sheets by, if additional layers are desired, repeating said steps of coating a sheet, conveying the coated sheet, lifting the coated sheet, and joining the coated sheet n−2 times, where n is the number of sheets in the final stack, said joining step, if repeated, including joining a coated sheet to another coated sheet disposed thereabove solely by the raising of the lower of such sheets and without lowering of the stack, the completed stack being in an elevated position above the conveying device; and
   (h) thereafter removing the stack from the lifting device in the elevated position of the stack without previously lowering the stack.

2. A process according to claim 1 wherein the lifting device includes the helical screw, the lifting device effecting disposition of the sheets one above the other by the helical screw and abutment to thereby provide upper and lower sheets and wherein the lifting device includes a flattened portion at an upper end of the helical screw and continuous therewith, said joining step including both moving an upper sheet into engagement with the flattened portion by the action of the helical screw to thereby terminate lifting and also bringing the lower sheet into engagement with the upper sheet by the action of the helical member to accomplish said joining step.

* * * * *